US012762458B2

(12) United States Patent
Kim et al.

(10) Patent No.: US 12,762,458 B2
(45) Date of Patent: Oct. 13, 2026

(54) QUANTUM ENCODING CIRCUIT FOR 5-QUBIT ERROR CORRECTING CODE

(71) Applicant: Electronics and Telecommunications Research Institute, Daejeon (KR)

(72) Inventors: Taewan Kim, Daejeon (KR); Yongsoo Hwang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 91 days.

(21) Appl. No.: 18/979,764

(22) Filed: Dec. 13, 2024

(65) Prior Publication Data

US 2025/0200418 A1 Jun. 19, 2025

(30) Foreign Application Priority Data

Dec. 14, 2023 (KR) ........................ 10-2023-0182066
Nov. 19, 2024 (KR) ........................ 10-2024-0165656

(51) Int. Cl.
*G06N 10/70* (2022.01)
*G06N 10/20* (2022.01)
*G06N 10/40* (2022.01)

(52) U.S. Cl.
CPC ............. *G06N 10/70* (2022.01); *G06N 10/20* (2022.01); *G06N 10/40* (2022.01)

(58) Field of Classification Search
CPC ......... G06N 10/70; G06N 10/20; G06N 10/40
USPC .......................................................... 714/799
See application file for complete search history.

(56) References Cited

U.S. PATENT DOCUMENTS

| | | | | |
|---|---|---|---|---|
| 12,271,786 B2 * | 4/2025 | Brown | G06N 10/70 |
| 2010/0251049 A1 * | 9/2010 | Goto | H03M 13/19<br>714/E11.032 |
| 2015/0115998 A1 * | 4/2015 | Eastin | H03K 19/195<br>326/7 |
| 2018/0069698 A1 | 3/2018 | Hong et al. | |
| 2019/0244128 A1 | 8/2019 | Choi et al. | |
| 2022/0197764 A1 | 6/2022 | Jun et al. | |
| 2023/0394019 A1 | 12/2023 | Gidney et al. | |
| 2024/0152335 A1 * | 5/2024 | Brown | G06N 10/20 |

(Continued)

FOREIGN PATENT DOCUMENTS

| | | | |
|---|---|---|---|
| CN | 114358294 B | 11/2023 |
| KR | 10-2022-0089757 A | 6/2022 |
| KR | 10-2023-0102654 A | 7/2023 |

OTHER PUBLICATIONS

Laflamme's perfect quantum error correcting code (5 qubit)—Not getting the correct syndrome bits—Quantum Computing Stack, 2022, 2 pages.

(Continued)

*Primary Examiner* — John J Tabone, Jr.
(74) *Attorney, Agent, or Firm* — Sughrue Mion, PLLC

(57) ABSTRACT

Disclosed are quantum circuits, and more particularly, to a quantum encoding circuit for a 5-qubit error correction code. A quantum encoding circuit for a 5-qubit error correction code according to one embodiment of the present document can be implemented with a circuit comprising rotation gate(s), CNOT gate(s), and CZ gate(s). A quantum encoding circuit for a 5-qubit error correction code according to another embodiment of the present document can be implemented with a circuit comprising rotation gate(s) and CZ gate(s), without CNOT gates.

12 Claims, 5 Drawing Sheets

(56) References Cited

U.S. PATENT DOCUMENTS

| | | | | |
|---|---|---|---|---|
| 2025/0200418 | A1* | 6/2025 | Kim | G06N 10/70 |
| 2025/0292143 | A1* | 9/2025 | Akahoshi | G06N 10/40 |
| 2025/0348773 | A1* | 11/2025 | Akahoshi | G06N 10/20 |
| 2025/0356230 | A1* | 11/2025 | Toshio | G06N 10/20 |
| 2026/0004172 | A1* | 1/2026 | Akahoshi | G06N 10/20 |

OTHER PUBLICATIONS

Samuel L. Braunstein et al., "Perfect quantum-error-correction coding in 24 laser pulses," Physical Review A, Feb. 1997, vol. 55, No. 2, 6 pages.

Ming Gong, et al. "Experimental exploration of five-qubit quantum error correcting code with superconducting qubits", National Science Review, Jan. 2022, vol. 9, No. 1 (20 pages).

* cited by examiner

QUANTUM ENCODING CIRCUIT FOR 5-QUBIT ERROR CORRECTING CODE

CROSS-REFERENCE TO RELATED APPLICATIONS

This application claims priority under 35 U.S.C. § 119 to Korean Patent Application No. 10-2023-0182066 filed on Dec. 14, 2023, and No. 10-2024-0165656 filed on Nov. 19, 2024, in the Korean Intellectual Property Office, the disclosures of which are incorporated by reference herein in their entireties.

BACKGROUND

Embodiments of the present disclosure described herein relate to a quantum circuit, and more particularly, relate to a quantum encoding circuit for a 5-qubit error correcting code.

Unlike conventional computing, quantum computing is a technology for processing information by using the principles of quantum mechanics. For the quantum computing, a quantum algorithm, which is more efficient than the conventional computing, such as Shor's algorithm has been proposed. However, because the quantum computing is greatly affected by environments in the microscopic world, there is a need for a method for correcting occurring errors.

Unlike conventional bits, a qubit is a basic unit of the quantum computing, and has the superposition property in which a qubit simultaneously has states of '0' and '1'. In this way, a single qubit may represent multiple states. Entanglement is a phenomenon that two or more qubits are related to each other, and the state of one qubit affects the state of another qubit. Entangled qubits may be considered as being connected to each other.

In the conventional computing, an error occurs in a form of a bit flip. However, in the quantum computing, various types of errors may occur. For example, a bit flip error of a qubit, a phase flip error of a qubit, or an error obtained by simultaneously combining the bit flip and the phase flip may occur. It is known that at least five physical qubits are needed to correct an error occurring in one logical qubit. A 5-qubit error correcting code is used to detect and correct a single qubit error by encoding one logical qubit into five physical qubits. In this way, the integrity of quantum information may be guaranteed.

When quantum error correction encoding of a logical qubit into five physical qubits is performed, a method for minimizing operations is required. Moreover, the types of operations supported depending on a hardware platform for implementing quantum computing may be limited. When the quantum error correction encoding is performed in a limited operation environment, a method for minimizing operations is required.

SUMMARY

Embodiments of the present disclosure provide a quantum encoding circuit that minimizes operations to perform fast and efficient quantum computing.

Embodiments of the present disclosure provide a quantum encoding circuit that minimizes operations in an environment where operation types are limited depending on a hardware platform.

According to an embodiment, a quantum encoding circuit includes a first layer including a first CNOT gate that performs a CNOT operation on a second physical qubit based on a first physical qubit, a first rotation gate that rotates a third physical qubit by π/2 around a Y-axis, a second rotation gate that rotates a fourth physical qubit by π/2 around the Y-axis, and a third rotation gate that rotates a fifth physical qubit by π/2 around an X-axis, a second layer including a second CNOT gate that performs a CNOT operation on the first physical qubit based on the third physical qubit, and a third CNOT gate that performs a CNOT operation on the second physical qubit based on the fifth physical qubit, a third layer including a fourth rotation gate that rotates the first physical qubit by π/2 around a Z-axis, and a fourth CNOT gate that performs a CNOT operation on the fifth physical qubit based on the fourth physical qubit, and a fourth layer including a fifth CNOT gate that performs a CNOT operation on the first physical qubit based on the fourth physical qubit, and a first CZ gate that performs a CZ operation between the third physical qubit and the fifth physical qubit.

According to an embodiment, a quantum encoding circuit includes a first layer including a first rotation gate that rotates a first physical qubit by π/2 around a Z-axis, a second rotation gate that rotates a second physical qubit by π/2 around a Y-axis, a third rotation gate that rotates a third physical qubit by π/2 around the Y-axis, a fourth rotation gate that rotates a fourth physical qubit by π/2 around the Y-axis, and a fifth rotation gate that rotates a fifth physical qubit by π/2 around an X-axis, a second layer including a first CZ gate that performs a CZ operation between the first physical qubit and the second physical qubit, and a second CZ gate that performs a CZ operation between the third physical qubit and the fifth physical qubit, a third layer including a sixth rotation gate that rotates the first physical qubit by π/2 around the Y-axis, a fourth layer including a third CZ gate that performs a CZ operation between the first physical qubit and the fourth physical qubit, and a fourth CZ gate that performs a CZ operation between the second physical qubit and the fifth physical qubit, a fifth layer including a seventh rotation gate that rotates the first physical qubit by π/2 around the X-axis, and an eighth rotation gate that rotates the fifth physical qubit by π/2 around the Y-axis, and a sixth layer including a fifth CZ gate that performs a CZ operation between the first physical qubit and the third physical qubit, and a sixth CZ gate that performs a CZ operation between the fourth physical qubit and the fifth physical qubit.

According to an embodiment, a quantum encoding circuit includes a first layer including a first rotation gate that rotates a first physical qubit by π/2 around a Y-axis, a second rotation gate that rotates a second physical qubit by π/2 around the Y-axis, a third rotation gate that rotates a third physical qubit by π/2 around the Y-axis, a first CNOT gate that performs a CNOT operation on a fourth physical qubit based on a fifth physical qubit, a second layer including a first CZ gate that performs a CZ operation between the first physical qubit and the second physical qubit, and a second CNOT gate that performs a CNOT operation on the fourth physical qubit based on the third physical qubit, a third layer including a second CZ gate that performs a CZ operation between the third physical qubit and the fifth physical qubit, and a third CZ gate that performs a CZ operation between the second physical qubit and the fourth physical qubit, a fourth layer including a third CNOT gate that performs a CNOT operation on the fifth physical qubit based on the second physical qubit, and a fourth CNOT gate that performs a CNOT operation on the third physical qubit based on the first physical qubit, and a fifth layer including a fifth CNOT gate that performs a CNOT operation on the fifth physical qubit based on the first physical qubit.

According to an embodiment, a quantum encoding circuit includes a first layer including a first rotation gate that rotates a first physical qubit by π/2 around a Y-axis, a second rotation gate that rotates a second physical qubit by π/2 around the Y-axis, a third rotation gate that rotates a third physical qubit by π/2 around the Y-axis, and a fourth rotation gate that rotates a fourth physical qubit by π/2 around the Y-axis, a second layer including a first CZ gate that performs a CZ operation between the first physical qubit and the second physical qubit, and a second CZ gate that performs a CZ operation between the fourth physical qubit and a fifth physical qubit, a third layer including a third CZ gate performing a CZ operation between the third physical qubit and the fifth physical qubit, a fourth layer including a fourth CZ gate that performs a CZ operation between the third physical qubit and the fourth physical qubit, and a fifth rotation gate that rotates the fifth physical qubit by −π/2 around the Y axis, a fifth layer including a sixth rotation gate that rotates the third physical qubit by π/2 around the Y-axis, a seventh rotation gate that rotates the fourth physical qubit by −π/2 around the Y-axis, and a fifth CZ gate that performs a CZ operation between the first physical qubit and the fifth physical qubit, a sixth layer including a sixth CZ gate that performs a CZ operation between the first physical qubit and the third physical qubit, an eighth rotation gate that rotates the fourth physical qubit by π around an X-axis, and a seventh CZ gate that performs a CZ operation between the second physical qubit and the fifth physical qubit, and a seventh layer including an eighth CZ gate that performs a CZ operation between the second physical qubit and the fourth physical qubit, a ninth rotation gate that rotates the third physical qubit by π/2 around the Y-axis, and a tenth rotation gate that rotates the fifth physical qubit by π/2 around the Y-axis.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
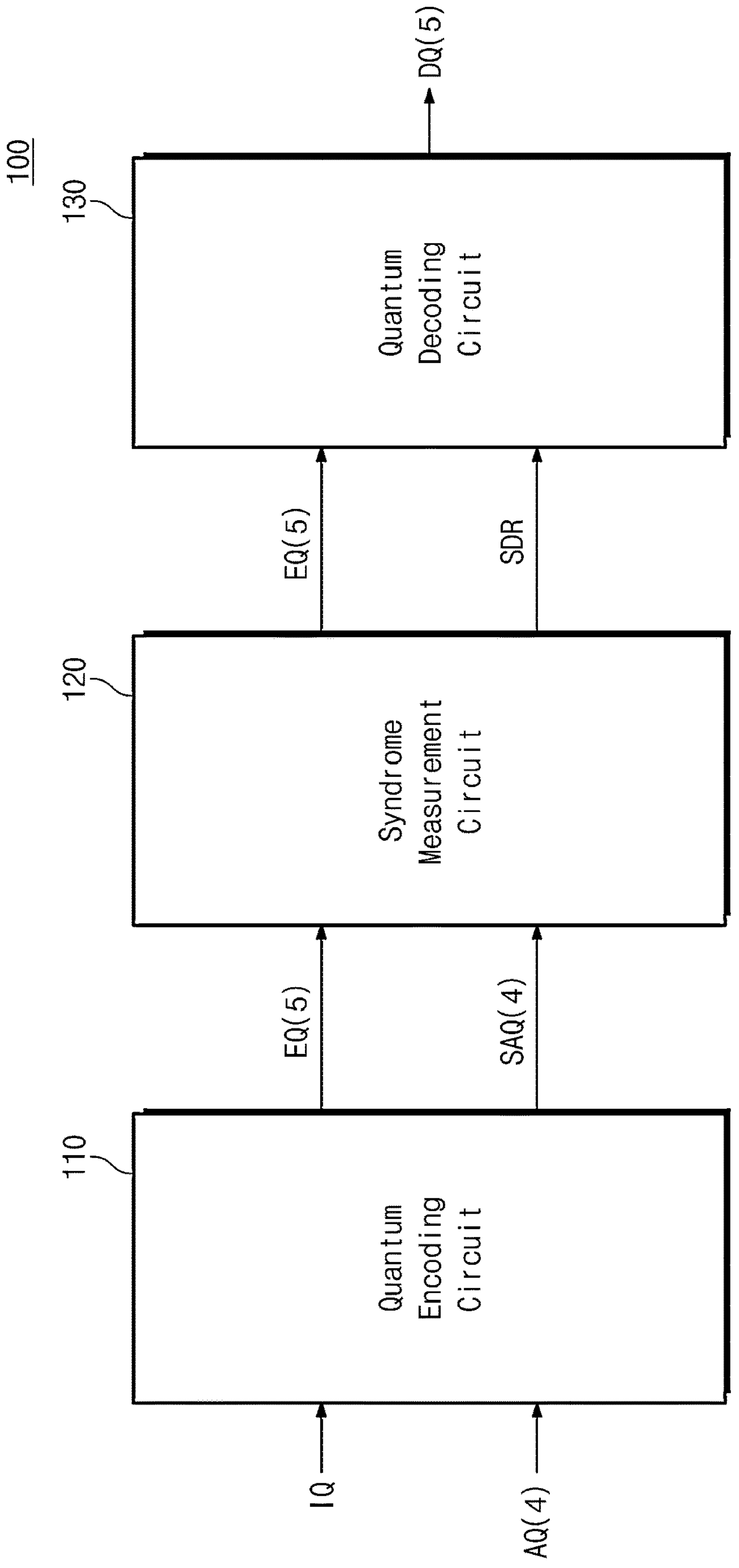
FIG. 1 is a block diagram illustrating a quantum error correcting circuit, according to an embodiment of the present disclosure.

FIG. 1 is a block diagram illustrating a quantum error correcting circuit, according to an embodiment of the present disclosure.

Referring to FIG. 1, a quantum error correcting circuit 100 may include a quantum encoding circuit 110, a syndrome measuring circuit 120, and a quantum decoding circuit 130.

The quantum encoding circuit 110 receives an input qubit IQ and auxiliary qubits AQ, and outputs encoded qubits EQ. The input qubit IQ may correspond to a logical qubit. The auxiliary qubits AQ are used such that the quantum encoding circuit 110 distributes information of the input qubit IQ. The encoded qubits EQ, which are the output of the quantum encoding circuit 110, are five physical qubits.

The quantum encoding circuit 110 may form a state, in which physical qubits are entangled and superposed, through quantum operations. That is, information of a logical qubit is distributed across the five physical qubits. The quantum encoding circuit 110 may perform a single-qubit operation or a multi-qubit operation on physical qubits. For example, the quantum encoding circuit 110 may perform a rotation operation on a physical qubit to create a superposition state. The quantum encoding circuit 110 may perform the multi-qubit operation (e.g., a CNOT operation) to create an entangled state between physical qubits.

The rotation operation performed by the quantum encoding circuit 110 may be represented as a rotation gate. The rotation gate refers to a gate that rotates the state of a qubit around a specific axis on a Bloch sphere. An RX gate may be one of rotation gates and may rotate a qubit around an X-axis by an angle θ. The RX gate may be expressed as a matrix of Equation 1.

$$R_X(\theta) = \begin{pmatrix} \cos\frac{\theta}{2} & -i\sin\frac{\theta}{2} \\ -i\sin\frac{\theta}{2} & \cos\frac{\theta}{2} \end{pmatrix} \quad \text{[Equation 1]}$$

An RY gate may be one of the rotation gates and may rotate a qubit around a Y-axis by an angle θ. The RY gate may be expressed as a matrix of Equation 2.

$$R_Y(\theta) = \begin{pmatrix} \cos\frac{\theta}{2} & -\sin\frac{\theta}{2} \\ \sin\frac{\theta}{2} & \cos\frac{\theta}{2} \end{pmatrix} \quad \text{[Equation 2]}$$

An RZ gate may be one of the rotation gates and may rotate a qubit around a Z-axis by an angle θ. The RZ gate may be expressed as a matrix of Equation 3.

$$R_Z(\theta) = \begin{pmatrix} e^{-i\frac{\theta}{2}} & 0 \\ 0 & e^{i\frac{\theta}{2}} \end{pmatrix} = \begin{pmatrix} \cos\frac{\theta}{2} - i\sin\frac{\theta}{2} & 0 \\ 0 & \cos\frac{\theta}{2} + i\sin\frac{\theta}{2} \end{pmatrix} \quad \text{[Equation 3]}$$

Among multi-qubit operations performed by the quantum encoding circuit 110, the CNOT operation may be expressed as a CNOT gate. The CNOT gate performs a CNOT operation on a target qubit based on a control qubit. When the control qubit is |0>, the CNOT gate may maintain the target qubit. When the control qubit is |1>, the CNOT gate may invert the target qubit. The CNOT gate may be expressed as a matrix of Equation 4.

$$CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix} \quad \text{[Equation 4]}$$

Among multi-qubit operations performed by the quantum encoding circuit 110, the CZ operation may be expressed as a CZ gate. The CZ gate performs a Z operation on the target qubit based on the control qubit. The Z operation refers to an operation of rotating a qubit around the Z-axis by an angle θ of 180° (i.e., π), and is also referred to as "Pauli-Z". When both the control qubit and the target qubit are |1>, the CZ gate inverts phases. The CZ gate may be expressed as a matrix of Equation 5. The CZ gate may generate the same result even when the control qubit and the target qubit are reordered.

$$CZ = \begin{pmatrix} 1 & 0 & 0 & 0 \\ 0 & 1 & 0 & 0 \\ 0 & 0 & 1 & 0 \\ 0 & 0 & 0 & -1 \end{pmatrix} \quad \text{[Equation 5]}$$

The quantum encoding circuit 110 may perform various qubit operations in addition to the above-described rotation gates or the above-described control gates.

The syndrome measuring circuit 120 measures the syndrome of the encoded qubits EQ output from the quantum encoding circuit 110. The syndrome measuring circuit 120 may use syndrome auxiliary qubits SAQ to measure the syndrome of the encoded qubits EQ. In a 5-qubit quantum error correcting code scheme, the number of syndrome auxiliary qubits SAQ may be four.

The syndrome measuring circuit 120 may form a correlation between the encoded qubits EQ and the syndrome auxiliary qubits SAQ by using a plurality of CNOT gates. The syndrome measuring circuit 120 may conventionally measure the syndrome auxiliary qubits SAQ and may obtain a syndrome measurement result SDR. The syndrome measurement result SDR may include information for specifying the location or the type of an error that occurs. For example, the syndrome measurement result SDR may include information about an error location, and whether a bit flip error, a phase flip error, or a combination thereof occurs in the encoded qubits EQ. An interpretation method of syndromes included in the syndrome measurement result SDR may be determined in the encoding scheme of the quantum encoding circuit 110.

The syndrome measuring circuit 120 may provide the quantum decoding circuit 130 with the encoded qubits EQ and the syndrome measurement result SDR.

The quantum decoding circuit 130 may perform a correction operation on a specific qubit among the encoded qubits EQ based on an error type and an error location included in the syndrome measurement result SDR. For example, when a bit flip error occurs in a physical qubit at a specific location, the bit flip error may be corrected by performing an X operation. When a phase flip error occurs in a physical qubit at a specific location, the phase flip error may be corrected by performing a Z operation. When a combinational error occurs in a physical qubit at a specific location, the combinational error may be corrected by performing a Y operation.

After the error correction, the quantum decoding circuit 130 may combine information distributed across five physical qubits into one logical qubit. That is, a reverse process of the encoding performed by the quantum encoding circuit 110 may be performed. The quantum decoding circuit 130 may output decoded qubits DQ. The decoded qubits DQ may include a logical qubit corresponding to one input qubit and the remaining auxiliary qubits.

In the meantime, when the quantum encoding circuit 110 performs encoding, it is required to have a minimum circuit depth to perform fast and efficient operations. Hereinafter, a quantum encoding circuit with the minimum circuit depth will be described.

Figure 2:
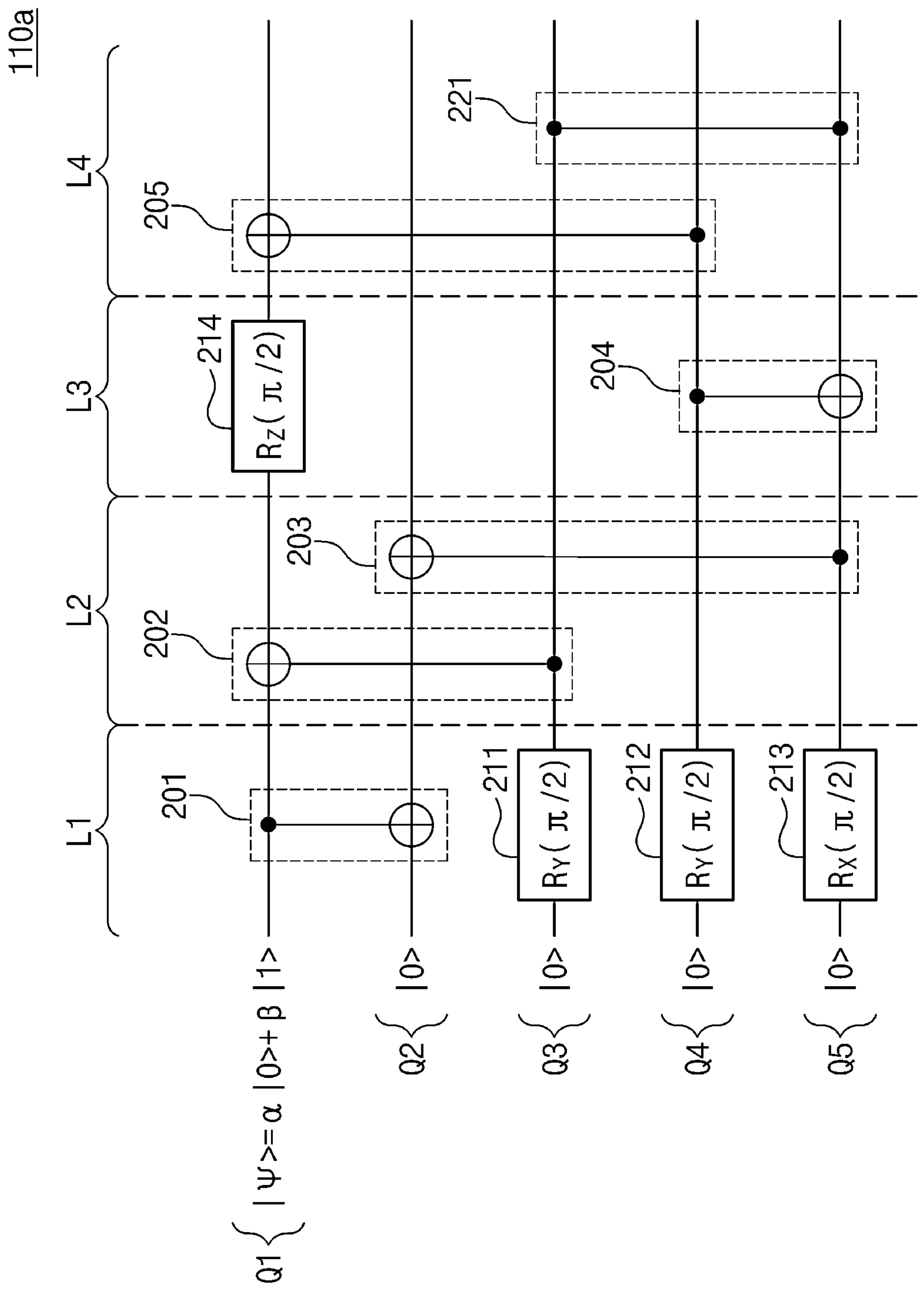
FIG. 2 is a quantum circuit diagram showing an example of a quantum encoding circuit, according to an embodiment of the present disclosure.

FIG. 2 is a quantum circuit diagram showing an example of a quantum encoding circuit, according to an embodiment of the present disclosure.

Referring to FIG. 2, a quantum encoding circuit **110*a* may perform encoding operations on five physical qubits Q1 to Q5**.

The first physical qubit Q1 corresponds to an input qubit IQ of the quantum encoding circuit **110*a*. The second to fifth physical qubits Q2 to Q5 correspond to auxiliary qubits. The input qubit |Ψ> may be expressed as "α|0>+β|1>". The auxiliary qubits may be initialized to |0>. The quantum encoding circuit 110*a* may distribute information of the first physical qubit Q1 by using the second to fifth physical qubits Q2 to Q5. As a result of applying the quantum encoding circuit 110 to the first to fifth physical qubits Q1 to Q5** composed of five qubits, a logical qubit corresponding to one qubit may be obtained.

The quantum encoding circuit **110*a* may include first to fourth layers L1 to L4. Each of the first to fourth layers L1 to L4 corresponds to a circuit depth. The quantum encoding circuit 110*a*** may have a circuit depth of 4. Each circuit depth indicates the number of operation steps in a quantum circuit. When a gate used in quantum operations is capable of being applied independently, the gate may correspond to one circuit depth (i.e., a layer). In a dependent case, such as a case where the operation result of one gate is used as the input for the operation of another gate, the gates may correspond to different circuit depths.

The first layer L1 of the quantum encoding circuit **110*a* may include a first CNOT gate 201, a first rotation gate 211, a second rotation gate 212, and a third rotation gate 213**.

The first CNOT gate 201 may perform a CNOT operation on the second physical qubit Q2 based on the first physical qubit Q1. That is, the first CNOT gate 201 may perform a CNOT operation by using the first physical qubit Q1 as a control qubit and using the second physical qubit Q2 as a target qubit.

The first rotation gate 211 may be an RY gate that rotates the third physical qubit Q3 around a Y-axis by π/2. The second rotation gate 212 may be an RY gate that rotates the fourth physical qubit Q4 around the Y-axis by π/2. The third rotation gate 213 may be an RX gate that rotates the fifth physical qubit Q5 around an X-axis by π/2.

The second layer L2 of the quantum encoding circuit **110*a* may include a second CNOT gate 202 and a third CNOT gate 203**.

The second CNOT gate 202 may perform a CNOT operation on the first physical qubit Q1 based on the third physical qubit Q3. The third CNOT gate 203 may perform a CNOT operation on the second physical qubit Q2 based on the fifth physical qubit Q5.

The third layer L3 of the quantum encoding circuit **110*a* may include a fourth rotation gate 214 and a fourth CNOT gate 204**.

The fourth rotation gate 214 may be an RZ gate that rotates the first physical qubit Q1 around a Z-axis by π/2.

The fourth CNOT gate 204 may perform a CNOT operation on the fifth physical qubit Q5 based on the fourth physical qubit Q4.

The fourth layer L4 of the quantum encoding circuit 110*a* may include a fifth CNOT gate 205 and a first CZ gate 221.

The fifth CNOT gate 205 may perform a CNOT operation on the first physical qubit Q1 based on the fourth physical qubit Q4. The first CZ gate 221 may perform a CZ operation between the third physical qubit Q3 and the fifth physical qubit Q5. That is, the first CZ gate 221 may perform a CZ operation by respectively using the third physical qubit Q3 and the fifth physical qubit Q5 as the control qubit and the target qubit.

The quantum encoding circuit 110*a* may distribute information of the physical qubit Q1 corresponding to the input qubit IQ to five qubits through the first to fourth layers L1 to L4. Even when a bit flip error, a phase flip error, or a combinational error thereof occurs in any one of the first to fifth physical qubits Q1 to Q5, the syndrome measurement result SDR including information about the type and the location of an error may be generated through the syndrome measuring circuit 120, and the quantum decoding circuit 130 may correct the error, which occurs in the first to fifth physical qubits Q1 to Q5, and may decode the first to fifth physical qubits Q1 to Q5 into a logical qubit based on the syndrome measurement result SDR. The logical qubit may be recovered as "α|0>+β|1>", which is the input qubit IQ, by decoding the quantum decoding circuit 130.

The quantum encoding circuit 110*a* may perform 5-qubit error correction encoding through the first to fourth layers L1 to L4 respectively corresponding to four circuit depths. The quantum encoding circuit 110*a* may perform fast and efficient encoding by minimizing a circuit depth.

In the meantime, a hardware platform for implementing the quantum encoding circuit 110*a* may not directly support the CNOT gate. In other words, when the hardware platform does not directly support a CNOT operation and only supports a CZ operation, the CNOT gate may be implemented with a CZ gate, a RX(π/2) rotation gate, and a RY(π/2) rotation gate. However, when the CNOT gate is implemented with a combination of the CZ gate, the RX(π/2) rotation gate, and the RY(π/2) rotation gate, the circuit depth may increase. Accordingly, a circuit composed of a CZ gate and rotation gates is required.

Figure 3:
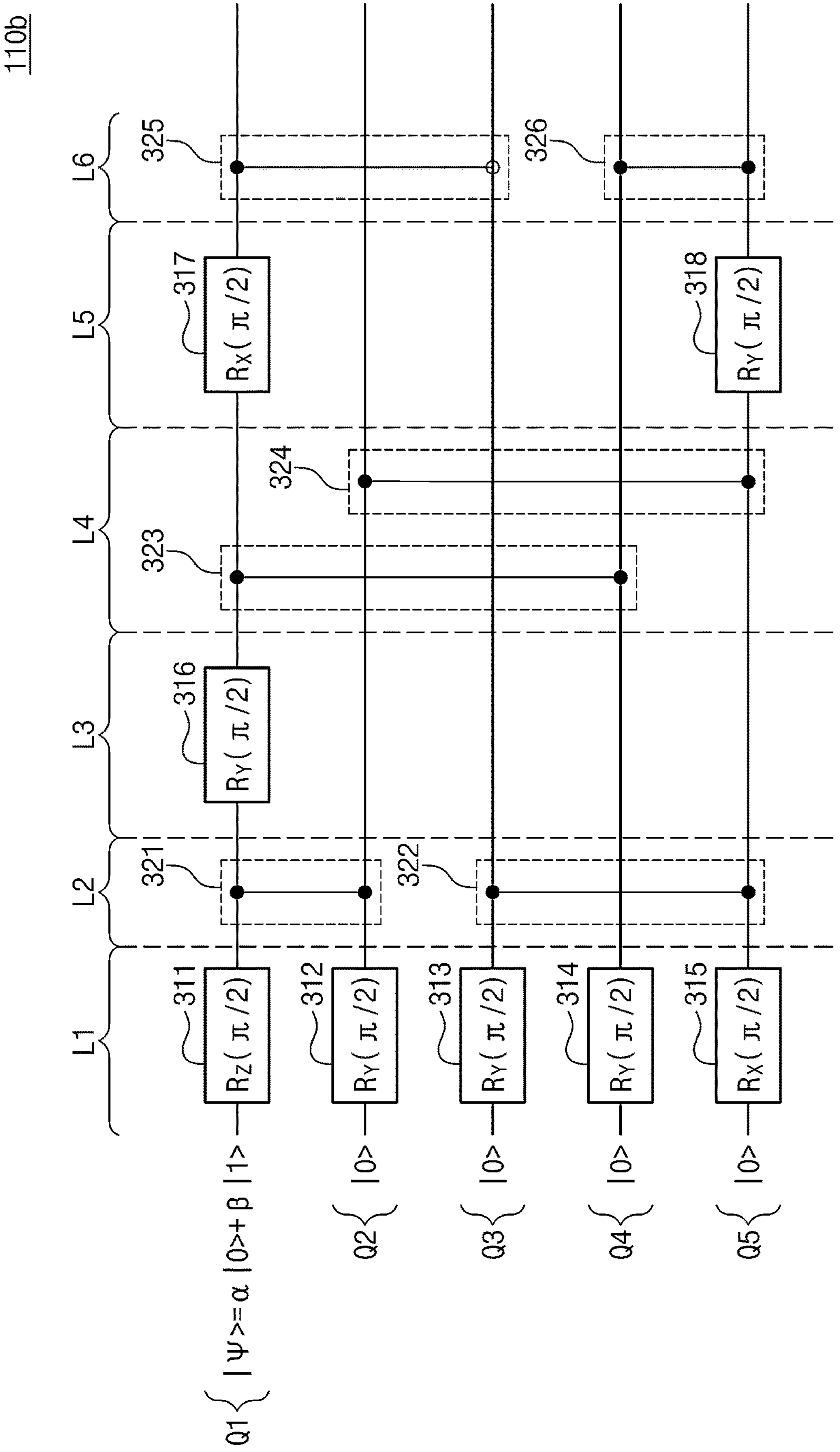
FIG. 3 is a quantum circuit diagram showing another example of a quantum encoding circuit, according to an embodiment of the present disclosure.

FIG. 3 is a quantum circuit diagram showing another example of a quantum encoding circuit, according to an embodiment of the present disclosure.

Referring to FIG. 3, a quantum encoding circuit 110*b* may perform encoding operations on five physical qubits Q1 to Q5.

The first physical qubit Q1 corresponds to an input qubit IQ of the quantum encoding circuit 110*b*. The second to fifth physical qubits Q2 to Q5 correspond to auxiliary qubits. The input qubit |Ψ> may be expressed as "α|0>+β|1>". The auxiliary qubits may be initialized to |0>. The quantum encoding circuit 110*b* may distribute information of the first physical qubit Q1 by using the second to fifth physical qubits Q2 to Q5.

The quantum encoding circuit 110*b* may be implemented without a CNOT gate by using rotation gates and CZ gates.

The quantum encoding circuit 110*b* may include first to sixth layers L1 to L6.

The first layer L1 of the quantum encoding circuit 110*b* may include first to fifth rotation gates 311 to 315.

The first rotation gate 311 may be an RZ gate that rotates the first physical qubit Q1 around a Z-axis by π/2. The second rotation gate 312 may be an RY gate that rotates the second physical qubit Q2 around a Y-axis by π/2. The third rotation gate 313 may be an RY gate that rotates the third physical qubit Q3 around the Y-axis by π/2. The fourth rotation gate 314 may be an RY gate that rotates the fourth physical qubit Q4 around the Y-axis by π/2. The fifth rotation gate 315 may be an RX gate that rotates the fifth physical qubit Q5 around an X-axis by π/2.

The second layer L2 of the quantum encoding circuit 110*b* may include a first CZ gate 321 and a second CZ gate 322.

The first CZ gate 321 may perform a CZ operation between the first physical qubit Q1 and the second physical qubit Q2. The second CZ gate 322 may perform a CZ operation between the third physical qubit Q3 and the fifth physical qubit Q5.

The third layer L3 of the quantum encoding circuit 110*b* may include a sixth rotation gate 316.

The sixth rotation gate 316 may be an RY gate that rotates the first physical qubit Q1 by π/2 around the Y-axis.

The fourth layer L4 of the quantum encoding circuit 110*b* may include a third CZ gate 323 and a fourth CZ gate 324.

The third CZ gate 323 may perform a CZ operation between the first physical qubit Q1 and the fourth physical qubit Q4. The fourth CZ gate 324 may perform a CZ operation between the second physical qubit Q2 and the fifth physical qubit Q5.

The fifth layer L5 of the quantum encoding circuit 110*b* may perform a seventh rotation gate 317 and an eighth rotation gate 318.

The seventh rotation gate 317 may be an RX gate that rotates the first physical qubit Q1 around the X-axis by π/2. The eighth rotation gate 318 may be an RY gate that rotates the fifth physical qubit Q5 by π/2 around the Y-axis.

The sixth layer L6 of the quantum encoding circuit 110*b* may include a fifth CZ gate 325, and a sixth CZ gate 326.

The fifth CZ gate 325 may perform a CZ operation between the first physical qubit Q1 and the third physical qubit Q3. The sixth CZ gate 326 may perform a CZ operation between the fourth physical qubit Q4 and the fifth physical qubit Q5.

The quantum encoding circuit 110*b* may distribute information of the physical qubit Q1 corresponding to the input qubit IQ to five qubits through the first to sixth layers L1 to L6.

Figure 4:
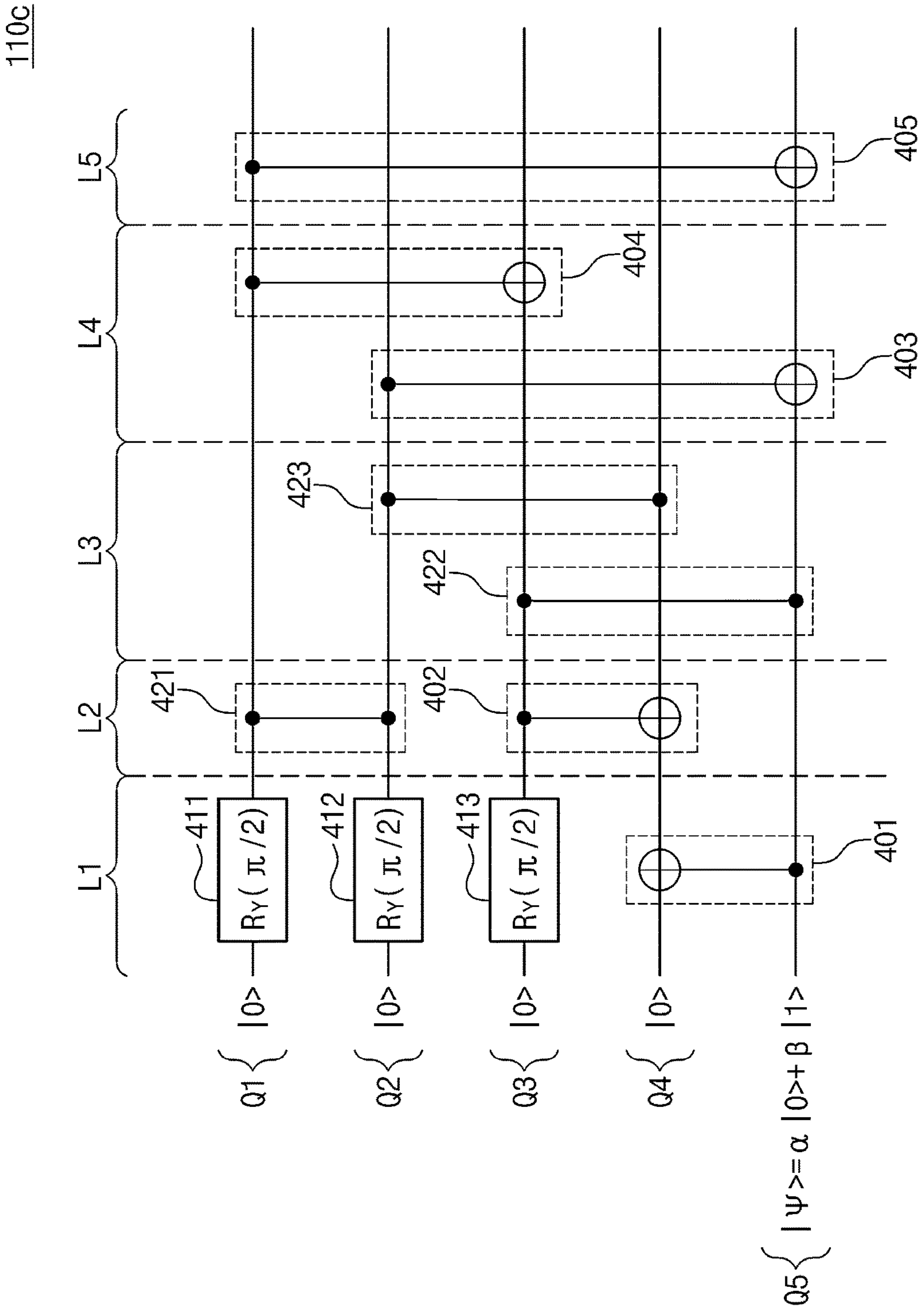
FIG. 4 is a quantum circuit diagram showing another example of a quantum encoding circuit, according to an embodiment of the present disclosure.

FIG. 4 is a quantum circuit diagram showing another example of a quantum encoding circuit, according to an embodiment of the present disclosure. Like an embodiment of FIG. 2, an embodiment of FIG. 4 relates to a quantum encoding circuit that uses all of a rotation gate, a CZ gate, and a CNOT gate. However, the quantum encoding circuit of FIG. 4 may has a circuit depth of 5 and may perform 5-qubit error correction encoding through first to fifth layers L1 to L5.

Referring to FIG. 4, a quantum encoding circuit 110*c* may perform encoding operations on five physical qubits Q1 to Q5.

The first to fourth physical qubits Q1 to Q4 correspond to auxiliary qubits. The fifth physical qubit Q5 corresponds to the input qubit IQ of the quantum encoding circuit 110*c*. The input qubit |Ψ> may be expressed as "α|0>+β|1>". The auxiliary qubits may be initialized to |0>. The quantum encoding circuit 110*c* may distribute information of the fifth physical qubit Q5 by using the first to fourth physical qubits Q1 to Q4.

The first layer L1 of the quantum encoding circuit 110*c* may include a first rotation gate 411, a second rotation gate 412, a third rotation gate 413, and a first CNOT gate 401.

The first rotation gate 411 may be an RY gate that rotates the first physical qubit Q1 by π/2 around a Y-axis. The second rotation gate 412 may be an RY gate that rotates the second physical qubit Q2 around the Y-axis by π/2. The third rotation gate 413 may be an RY gate that rotates the third physical qubit Q3 around the Y-axis by π/2. The first CNOT gate 401 may perform a CNOT operation on the fourth physical qubit Q4 based on the fifth physical qubit Q5.

The second layer L2 of the quantum encoding circuit 110*c* may include a first CZ gate 421 and a second CNOT gate 402.

The first CZ gate 421 may perform a CZ operation between the first physical qubit Q1 and the second physical qubit Q2. The second CNOT gate 402 may perform a CNOT operation on the fourth physical qubit Q4 based on the third physical qubit Q3.

The third layer L3 of the quantum encoding circuit 110*c* may include a second CZ gate 422 and a third CZ gate 423.

The second CZ gate 422 may perform a CZ operation between the third physical qubit Q3 and the fifth physical qubit Q5. The third CZ gate 423 may perform a CZ operation between the second physical qubit Q2 and the fourth physical qubit Q4.

The fourth layer L4 of the quantum encoding circuit 110*a* may include a third CNOT gate 403, and a fourth CNOT gate 404.

The third CNOT gate 403 may perform a CNOT operation on the fifth physical qubit Q5 based on the second physical qubit Q2. The fourth CNOT gate 404 may perform a CNOT operation on the third physical qubit Q3 based on the first physical qubit Q1.

The fifth layer L5 of the quantum encoding circuit 110*a* may include a fifth CNOT gate 405.

The fifth CNOT gate 405 may perform a CNOT operation on the fifth physical qubit Q5 based on the first physical qubit Q1.

The quantum encoding circuit 110*c* may distribute information of the physical qubit Q1 corresponding to the input qubit IQ to five qubits through the first to fifth layers L1 to L5.

Figure 5:
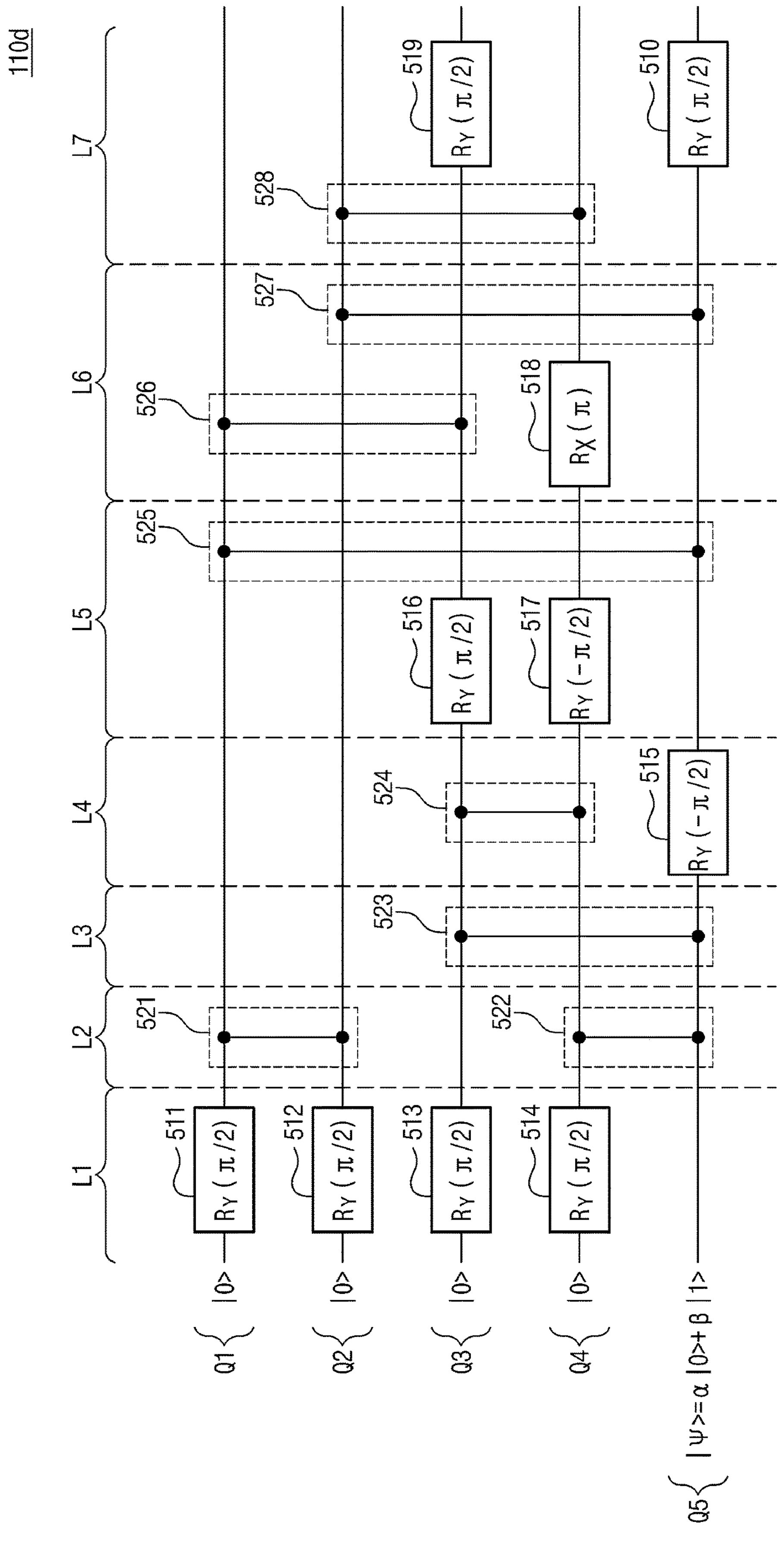
FIG. 5 is a quantum circuit diagram showing another example of a quantum encoding circuit, according to an embodiment of the present disclosure.

FIG. 5 is a quantum circuit diagram showing another example of a quantum encoding circuit, according to an embodiment of the present disclosure. Like an embodiment of FIG. 3, an embodiment of FIG. 5 relates to a quantum encoding circuit that uses only a rotation gate and a CZ gate without a CNOT gate. However, the quantum encoding circuit of FIG. 5 may has a circuit depth of 7 and may perform 5-qubit error correction encoding through first to seventh layers L1 to L7.

Referring to FIG. 5, a quantum encoding circuit 110*d* may perform encoding operations on five physical qubits Q1 to Q5.

The first to fourth physical qubits Q1 to Q4 correspond to auxiliary qubits. The fifth physical qubit Q5 corresponds to the input qubit IQ of the quantum encoding circuit 110*d*. The input qubit |Ψ> may be expressed as "α|0>+β|1>". The auxiliary qubits may be initialized to |0>. The quantum encoding circuit 110*d* may distribute information of the fifth physical qubit Q5 by using the first to fourth physical qubits Q1 to Q4.

The quantum encoding circuit 110*d* may be implemented without a CNOT gate by using rotation gates and CZ gates.

The quantum encoding circuit 110*d* may include first to seventh layers L1 to L7.

The first layer L1 of the quantum encoding circuit 110*d* may include first to fourth rotation gates 511 to 514.

The first rotation gate 511 may be an RY gate that rotates the first physical qubit Q1 by π/2 around a Y-axis. The second rotation gate 512 may be an RY gate that rotates the second physical qubit Q2 around the Y-axis by π/2. The third rotation gate 513 may be an RY gate that rotates the third physical qubit Q3 around the Y-axis by π/2. The fourth rotation gate 514 may be an RY gate that rotates the fourth physical qubit Q4 around the Y-axis by π/2.

The second layer L2 of the quantum encoding circuit 110*d* may include a first CZ gate 521 and a second CZ gate 522.

The first CZ gate 521 may perform a CZ operation between the first physical qubit Q1 and the second physical qubit Q2. The second CZ gate 522 may perform a CZ operation between the fourth physical qubit Q4 and the fifth physical qubit Q5.

The third layer L3 of the quantum encoding circuit 110*d* may include a third CZ gate 523. The third CZ gate 523 may perform a CZ operation between the third physical qubit Q3 and the fifth physical qubit Q5.

The fourth layer L4 of the quantum encoding circuit 110*d* may include a fourth CZ gate 524 and a fifth rotation gate 515.

The fourth CZ gate 524 may perform a CZ operation between the third physical qubit Q3 and the fourth physical qubit Q4. The fifth rotation gate 515 may be an RY gate that rotates the fifth physical qubit Q5 by −π/2 around the Y-axis.

The fifth layer L5 of the quantum encoding circuit 110*d* may perform a sixth rotation gate 516, a seventh rotation gate 517, and a fifth CZ gate 525.

The sixth rotation gate 516 may be an RY gate that rotates the third physical qubit Q3 around the Y-axis by π/2. The seventh rotation gate 517 may be an RY gate that rotates the fourth physical qubit Q4 around the Y-axis by −π/2. The fifth CZ gate 525 may perform a CZ operation between the first physical qubit Q1 and the fifth physical qubit Q5.

The sixth layer L6 of the quantum encoding circuit 110*d* may include a sixth CZ gate 526, an eighth rotation gate 518, and a seventh CZ gate 527.

The sixth CZ gate 526 may perform a CZ operation between the first physical qubit Q1 and the third physical qubit Q3. The eighth rotation gate 518 may be an RX gate that rotates the fourth physical qubit Q4 around an X-axis by π. The seventh CZ gate 527 may perform a CZ operation between the second physical qubit Q2 and the fifth physical qubit Q5.

The seventh layer L7 of the quantum encoding circuit 110*d* may include an eighth CZ gate 528, a ninth rotation gate 519, and a tenth rotation gate 510.

The eighth CZ gate 528 may perform a CZ operation between the second physical qubit Q2 and the fourth physical qubit Q4. The ninth rotation gate 519 may be an RY gate that rotates the third physical qubit Q3 around the Y-axis by π/2. The tenth rotation gate 510 may be an RY gate that rotates the fifth physical qubit Q5 by −π/2 around the Y-axis.

The quantum encoding circuit 110*d* may distribute information of the physical qubit Q5 corresponding to the input qubit IQ to five qubits through the first to seventh layers L1 to L7.

The quantum encoding circuit 110*b* and the quantum encoding circuit 110*d* may be implemented without a CNOT gate by using rotation gates and CZ gates. In this way, when a hardware platform does not directly support a CNOT gate, a 5-qubit quantum error correction encoding with a minimal circuit depth may be implemented by using only rotation gates and CZ gates.

According to embodiments described above, the quantum encoding circuit may have a minimum circuit depth. In this way, fast and efficient quantum computing becomes possible. Moreover, even when the types of operations directly provided by the hardware platform are limited, a quantum encoding circuit having a minimum circuit depth may be provided by using the limited types of operations.

A quantum computer, in which a quantum circuit is implemented, may consist of a plurality of components that perform various functions. For example, the quantum computer, in which the quantum circuit described above is implemented, may include a CPU for processing quantum information, a memory for storing the quantum information, and a bus for delivering information between the CPU and the memory.

The CPU may function as a central processing unit of the quantum computer. The CPU may operate by utilizing the computational space of the memory. Under the control of the CPU, the quantum circuit may perform an operation of a control-rotation gate using a control qubit, a target qubit, and an auxiliary qubit. Under the control of the CPU, the quantum circuit may generate the control qubit, the target qubit, and the auxiliary qubit and may perform an operation according to a gate operation on the target qubit based on a state of the control qubit. The processing speed of quantum information may be improved and resources for processing quantum information may be reduced, by using the quantum circuit according to an embodiment of the present disclosure.

The above description refers to detailed embodiments for implementing the present disclosure. The present disclosure may include embodiments in which a design is changed simply or which are easily changed, as well as the embodiments described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

A quantum coding circuit according to an embodiment of the present disclosure may provide fast and efficient quantum computing through 5-qubit quantum error correction encoding with a minimum circuit depth.

A quantum encoding circuit according to an embodiment of the present disclosure may provide 5-qubit quantum error correction encoding that minimizes operations in an environment where the types of operations directly supported depending on a hardware platform are limited.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum encoding circuit comprising:

a first layer including a first CNOT gate configured to perform a CNOT operation on a second physical qubit based on a first physical qubit, a first rotation gate configured to rotate a third physical qubit by π/2 around a Y-axis, a second rotation gate configured to rotate a fourth physical qubit by π/2 around the Y-axis, and a third rotation gate configured to rotate a fifth physical qubit by π/2 around an X-axis;

a second layer including a second CNOT gate configured to perform a CNOT operation on the first physical qubit, operated in the first layer, based on the third physical qubit operated in the first layer, and a third CNOT gate configured to perform a CNOT operation on the second physical qubit, operated in the first layer, based on the fifth physical qubit operated in the first layer;

a third layer including a fourth rotation gate configured to rotate the first physical qubit, operated in the second layer, by π/2 around a Z-axis, and a fourth CNOT gate configured to perform a CNOT operation on the fifth physical qubit, operated in the second layer, based on the fourth physical qubit operated in the first layer; and a fourth layer including a fifth CNOT gate configured to perform a CNOT operation on the first physical qubit, operated in the third layer, based on the fourth physical qubit operated in the third layer, and a first CZ gate configured to perform a CZ operation between the third physical qubit operated in the second layer and the fifth physical qubit operated in the third layer.

2. The quantum encoding circuit of claim 1, wherein the first physical qubit corresponds to an input qubit, and the second to fifth physical qubits correspond to auxiliary qubits.

3. The quantum encoding circuit of claim 2, wherein the auxiliary qubits are initialized as being in |0> states.

4. The quantum encoding circuit of claim 1, wherein the first CNOT gate performs the CNOT operation with the first physical qubit as a control qubit and the second physical qubit as a target qubit, the second CNOT gate performs the CNOT operation with the third physical qubit operated in the first layer as a control qubit and the first physical qubit operated in the first layer as a target qubit, the third CNOT gate performs the CNOT operation with the fifth physical qubit operated in the first layer as a control qubit and the second physical qubit operated in the first layer as a target qubit, the fourth CNOT gate performs the CNOT operation with the fourth physical qubit operated in the first layer as a control qubit and the fifth physical qubit operated in the second layer as a target qubit, and the first CZ gate performs the CZ operation with the third physical qubit operated in the second layer as a control qubit and the fifth physical qubit operated in the third layer as a target qubit.

5. A quantum encoding circuit comprising:

a first CNOT gate configured to perform a CNOT operation on a second physical qubit based on a first physical qubit;

a first rotation gate configured to rotate a third physical qubit by π/2 around a Y-axis;

a second rotation gate configured to rotate a fourth physical qubit by π/2 around the Y-axis;

a third rotation gate configured to rotate a fifth physical qubit by π/2 around an X-axis;

a second CNOT gate configured to perform a CNOT operation on the first physical qubit, operated by the first CNOT gate, based on the third physical qubit operated by the first rotation gate;

a third CNOT gate configured to perform a CNOT operation on the second physical qubit, operated by the first CNOT gate, based on the fifth physical qubit operated by the third rotation gate;

a fourth rotation gate configured to rotate the first physical qubit, operated by the second CNOT gate, by π/2 around a Z-axis;

a fourth CNOT gate configured to perform a CNOT operation on the fifth physical qubit, operated by the third CNOT gate, based on the fourth physical qubit operated by the second rotation gate;

a fifth CNOT gate configured to perform a CNOT operation on the first physical qubit, operated by the fourth rotation gate, based on the fourth physical qubit operated by the fourth CNOT gate; and a first CZ gate configured to perform a CZ operation between the third physical qubit operated by the second CNOT gate and the fifth physical qubit operated by the fourth CNOT gate.

6. The quantum encoding circuit of claim 5, wherein the first physical qubit corresponds to an input qubit, and the second to fifth physical qubits correspond to auxiliary qubits.

7. The quantum encoding circuit of claim 6, wherein the auxiliary qubits are initialized as being in |0> states.

8. The quantum encoding circuit of claim 5, wherein the first CNOT gate performs the CNOT operation with the first physical qubit as a control qubit and the second physical qubit as a target qubit, the second CNOT gate performs the CNOT operation with the third physical qubit operated by the first rotation gate as a control qubit and the first physical qubit operated by the first CNOT gate as a target qubit, the third CNOT gate performs the CNOT operation with the fifth physical qubit operated by the third rotation gate as a control qubit and the second physical qubit operated by the first CNOT gate as a target qubit, the fourth CNOT gate performs the CNOT operation with the fourth physical qubit operated by the second rotation gate as a control qubit and the fifth physical qubit operated by the third CNOT gate as a target qubit, the fifth CNOT gate performs the CNOT operation with the fourth physical qubit operated by the fourth CNOT gate as a control qubit and the first physical qubit operated by the fourth rotation gate as a target qubit, and the first CZ gate performs the CZ operation with the third physical qubit operated by the second CNOT gate as a control qubit and the fifth physical qubit operated by the fourth CNOT gate as a target qubit.

9. A quantum encoding circuit comprising:

a first rotation gate configured to rotate a first physical qubit by π/2 around a Z-axis;

a second rotation gate configured to rotate a second physical qubit by π/2 around a Y-axis;

a third rotation gate configured to rotate a third physical qubit by π/2 around the Y-axis;

a fourth rotation gate configured to rotate a fourth physical qubit by π/2 around the Y-axis;

a fifth rotation gate configured to rotate a fifth physical qubit by π/2 around an X-axis;

a first CZ gate configured to perform a CZ operation between the first physical qubit operated by the first rotation gate and the second physical qubit operated by the second rotation gate;

a second CZ gate configured to perform a CZ operation between the third physical qubit operated by the third rotation gate and the fifth physical qubit operated by the fifth rotation gate;

a sixth rotation gate configured to rotate the first physical qubit, operated by the first CZ gate, by π/2 around a Y-axis;

a third CZ gate configured to perform a CZ operation between the first physical qubit operated by the sixth rotation gate and the fourth physical qubit operated by the fourth rotation gate;

a fourth CZ gate configured to perform a CZ operation between the second physical qubit operated by the first CZ gate and the fifth physical qubit operated by the second CZ gate;

a seventh rotation gate configured to rotate the first physical qubit, operated by the third CZ gate, by π/2 around an X-axis;

an eighth rotation gate configured to rotate the fifth physical qubit, operated by the fourth CZ gate, by π/2 around a Y-axis;

a fifth CZ gate configured to perform a CZ operation between the first physical qubit operated by the seventh rotation gate and the third physical qubit operated by the second CZ gate; and a sixth CZ gate configured to perform a CZ operation between the fourth physical qubit operated by the third CZ gate and the fifth physical qubit operated by the eighth rotation gate.

10. The quantum encoding circuit of claim 9, wherein the first physical qubit corresponds to an input qubit, and the second to fifth physical qubits correspond to auxiliary qubits.

11. The quantum encoding circuit of claim 10, wherein the auxiliary qubits are initialized as being in |0> states.

12. The quantum encoding circuit of claim 9, wherein the first CZ gate performs the CZ operation with the first physical qubit operated by the first rotation gate as a control qubit and the second physical qubit operated by the second rotation gate as a target qubit, the second CZ gate performs the CZ operation with the third physical qubit operated by the third rotation gate as a control qubit and the fifth physical qubit operated by the fifth rotation gate as a target qubit, the third CZ gate performs the CZ operation with the first physical qubit operated by the sixth rotation gate as a control qubit and the fourth physical qubit operated by the fourth rotation gate as a target qubit, the fourth CZ gate performs the CZ operation with the second physical qubit operated by the first CZ gate as a control qubit and the fifth physical qubit operated by the second CZ gate as a target qubit, the fifth CZ gate performs the CZ operation between the first physical qubit operated by the seventh rotation gate and the third physical qubit operated by the second CZ gate, and the sixth CZ gate performs the CZ operation with the fourth physical qubit operated by the third CZ gate as a control qubit and the fifth physical qubit operated by the eighth rotation gate as a target qubit.

* * * * *